United States Patent
Fan (10) Patent No.: US 8,854,828 B2
(45) Date of Patent: Oct. 7, 2014

(54) CONNECTING MODULE AND MECHANISM USING THE SAME

(75) Inventor: Chin-Lung Fan, New Taipei (TW)

(73) Assignee: Wistron Corporation, New Taipei (TW)

( * ) Notice: Subject to any disclaimer, the term of this patent is extended or adjusted under 35 U.S.C. 154(b) by 412 days.

(21) Appl. No.: 13/366,777

(22) Filed: Feb. 6, 2012

(65) Prior Publication Data

US 2013/0058056 A1 Mar. 7, 2013

(30) Foreign Application Priority Data

Sep. 1, 2011 (TW) .............................. 100131575 A (51) Int. Cl.
| | |
|---|---|
| *H05K 5/00* | (2006.01) |
| *H01R 13/44* | (2006.01) |
| *G06F 1/16* | (2006.01) |

(52) U.S. Cl.
CPC ...... *G06F 1/1656* (2013.01); *G06F 2200/1639* (2013.01); *H01R 2201/06* (2013.01)
USPC . 361/755; 361/679.58; 361/752; 361/679.28; 439/131

(58) Field of Classification Search
CPC .......... H01R 13/5213; H01R 13/447–13/4538; H01R 13/65802; G02B 6/4277; G02B 6/3817; G02B 6/3831; G02B 6/3849; G02B 6/3897
USPC ..................... 361/755, 679.58, 752; 439/131, 439/135–149
See application file for complete search history.

(56) References Cited

U.S. PATENT DOCUMENTS

| | | | |
|---|---|---|---|
| 5,634,802 A * | 6/1997 | Kerklaan ....................... | 439/131 |
| 5,679,013 A * | 10/1997 | Matsunaga et al. ........... | 439/144 |
| 5,879,173 A * | 3/1999 | Poplawski et al. ............ | 439/138 |
| 6,038,125 A * | 3/2000 | Anzai ........................... | 361/609 |
| 6,155,882 A * | 12/2000 | Wu ................................ | 439/676 |
| 6,773,291 B1 * | 8/2004 | Roth et al. ..................... | 439/344 |
| 6,873,808 B2 * | 3/2005 | Ueda .............................. | 399/90 |
| 7,529,458 B2 * | 5/2009 | Spisany et al. ................ | 385/137 |
| 7,695,305 B1 | 4/2010 | Ray et al. | |

(Continued)

FOREIGN PATENT DOCUMENTS

TW 201036272 A 10/2010

OTHER PUBLICATIONS

CN Office Action dated Jul. 23, 2014.

(Continued)

*Primary Examiner* — Adrian S Wilson
*Assistant Examiner* — Abhishek Rathod
(74) *Attorney, Agent, or Firm* — McClure, Qualey & Rodack, LLP (57) ABSTRACT

A connecting module, disposed at a casing having a through hole, includes a door, a connecting port and an elastic member. The door is rotatably coupled to the casing so as to be located at a first position to cover the through hole or at a second position to open with respect to the casing. The connecting port is disposed at an inner side of the door so as to be disposed inside the casing when the door is located at the first position or exposed outside the casing when the door is located at the second position. The elastic member is rotatably coupled to the connecting port so as to rotate with respect to the connecting port to fasten a plug between the connecting port and the elastic member when the plug is connected to the connecting port.

8 Claims, 7 Drawing Sheets

(56) References Cited

U.S. PATENT DOCUMENTS

| | | | |
|---|---|---|---|
| 7,850,371 B2* | 12/2010 | Riley et al. | 385/77 |
| 7,988,468 B2* | 8/2011 | Yang et al. | 439/136 |
| 8,337,222 B2 | 12/2012 | Hung et al. | |
| 2005/0019054 A1* | 1/2005 | Ueda | 399/90 |
| 2008/0057772 A1* | 3/2008 | Peng et al. | 439/372 |
| 2009/0130875 A1* | 5/2009 | Guo | 439/141 |
| 2009/0141445 A1* | 6/2009 | Lu | 361/679.55 |
| 2010/0317203 A1* | 12/2010 | Tracy et al. | 439/131 |
| 2011/0013372 A1* | 1/2011 | Kang | 361/752 |
| 2011/0136355 A1* | 6/2011 | Delpier et al. | 439/131 |
| 2012/0108088 A1* | 5/2012 | Peng et al. | 439/135 |

OTHER PUBLICATIONS

Partial English translation of CN Office Action dated Jul. 23, 2014.
TW Office Action dated May 20, 2014.
Partial English translation of TW Office Action dated May 20, 2014.

* cited by examiner

CONNECTING MODULE AND MECHANISM USING THE SAME

This application claims the benefit of Taiwan application Serial No. 100131575, filed Sep. 1, 2011, the subject matter of which is incorporated herein by reference.

BACKGROUND OF THE INVENTION

1. Field of the Invention

The invention relates in general to a connecting module and a mechanism using the same, and more particularly to a connecting module for a plug to be connected thereto and a mechanism using the same.

2. Description of the Related Art

Along with the rapid development and advance in technology, electronic devices have gained greater and greater popularity. Let the notebook computer be taken for example. The notebook computer has smaller size and lighter weight than the desktop computer, and it is very popular that the notebook computer user tends to carry and use the notebook computer in various occasions. Under the thinning tendency in product design, the notebook computer also gets thinner and thinner.

To achieve a thinned notebook computer, the design of a part of the elements must be conformed to the thinning tendency in product design, or the elements with height requirements are directly avoided. For example, the LAN port and the circuit board are stacked and disposed in the notebook computer in a top down manner, and the interior of the notebook computer must reserve a space for the LAN port and circuit board. However, such arrangement usually adds the thickness of the notebook computer and reduces the flexibility of disposing other elements in the notebook computer.

Some manufacturers directly replace the LAN port with a wireless communication module for providing network communication to the notebook computer. However, the network function may be incapacitated when wireless communication is not available or the user forgets to carry the wireless communication module. Therefore, how to provide a connecting port conformed to the thinning tendency in product design has become a prominent task for the industries.

SUMMARY OF THE INVENTION

The invention is directed to a connecting module and a mechanism using the same. The connecting port is received in a casing when the connecting port is not used by the user and is exposed for a plug to be connected thereto when the connecting port is used by the user. Thus, the thinning tendency in product design is satisfied, and the product is convenient for the user to carry and use.

According to one embodiment of the present invention, a connecting module disposed at a casing having a through hole is provided. The connecting module includes a door, a connecting port and an elastic member. The door is rotatably coupled to the casing so as to be located at a first position to cover the through hole or be located at a second position to open with respect to the casing. The connecting port is disposed at an inner side of the door so as to be disposed inside the casing when the door is located at the first position or exposed outside the casing when the door is located at the second position. The elastic member is rotatably coupled to the connecting port so as to rotate with respect to the connecting port to fasten a plug between the connecting port and the elastic member when the plug is connected to the connecting port.

According to an alternate embodiment of the present invention, a mechanism including a casing and a connecting module is further provided. The casing has a through hole. The connecting module is disposed at the casing and includes a door, a connecting port and an elastic member. The door is rotatably coupled to the casing so as to be located at a first position to cover the through hole or be located at a second position to open with respect to the casing. The connecting port is disposed at an inner side of the door so as to be disposed inside the casing when the door is located at the first position or exposed outside the casing when the door is located at the second position. The elastic member is rotatably coupled to the connecting port so as to rotate with respect to the connecting port to fasten a plug between the connecting port and the elastic member when the plug is connected to the connecting port.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
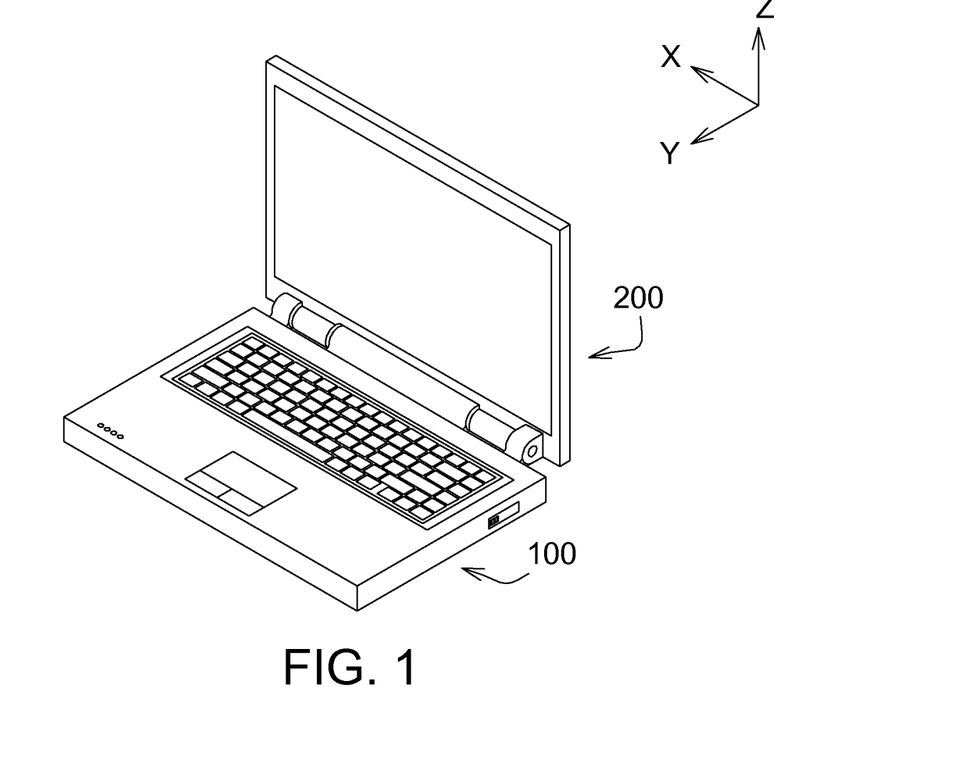
FIG. 1 shows a schematic diagram of a portable electronic device according to one embodiment of the invention.

Referring to FIG. 1, a schematic diagram of a portable electronic device according to one embodiment of the invention is shown. The portable electronic devices, such as a notebook computer, includes a mechanism 100 and a mechanism 200 coupled to each other.

Figure 2A:
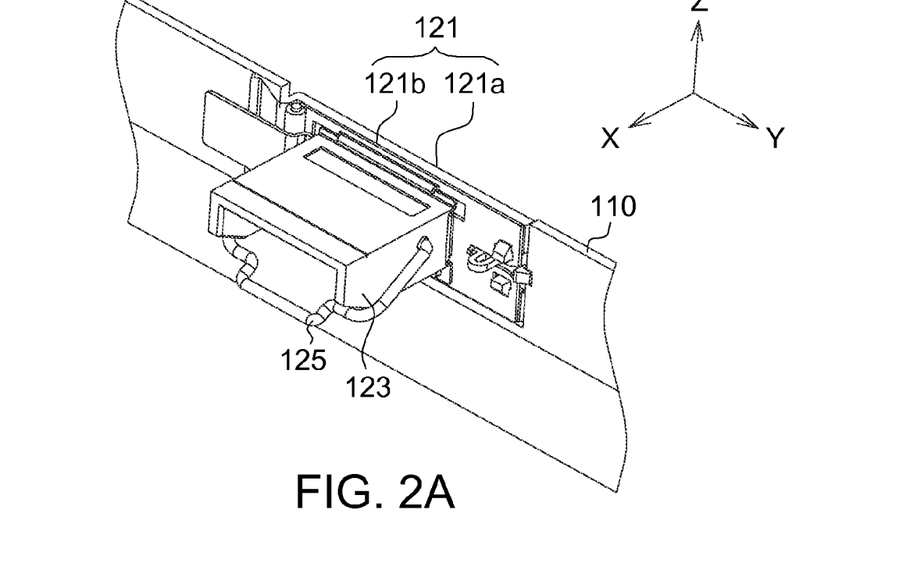
FIG. 2A and FIG. 2B respectively illustrate schematic diagrams of a connecting module of one of the mechanisms of FIG. 1 located at different positions.
Figure 2B:
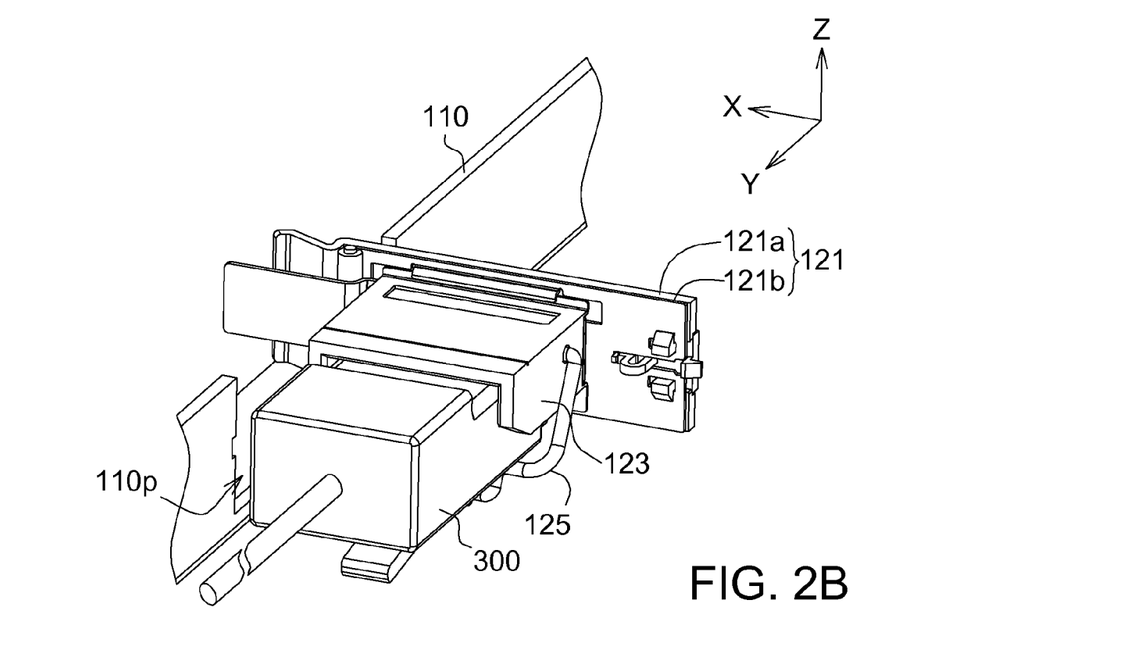
Figure 3:
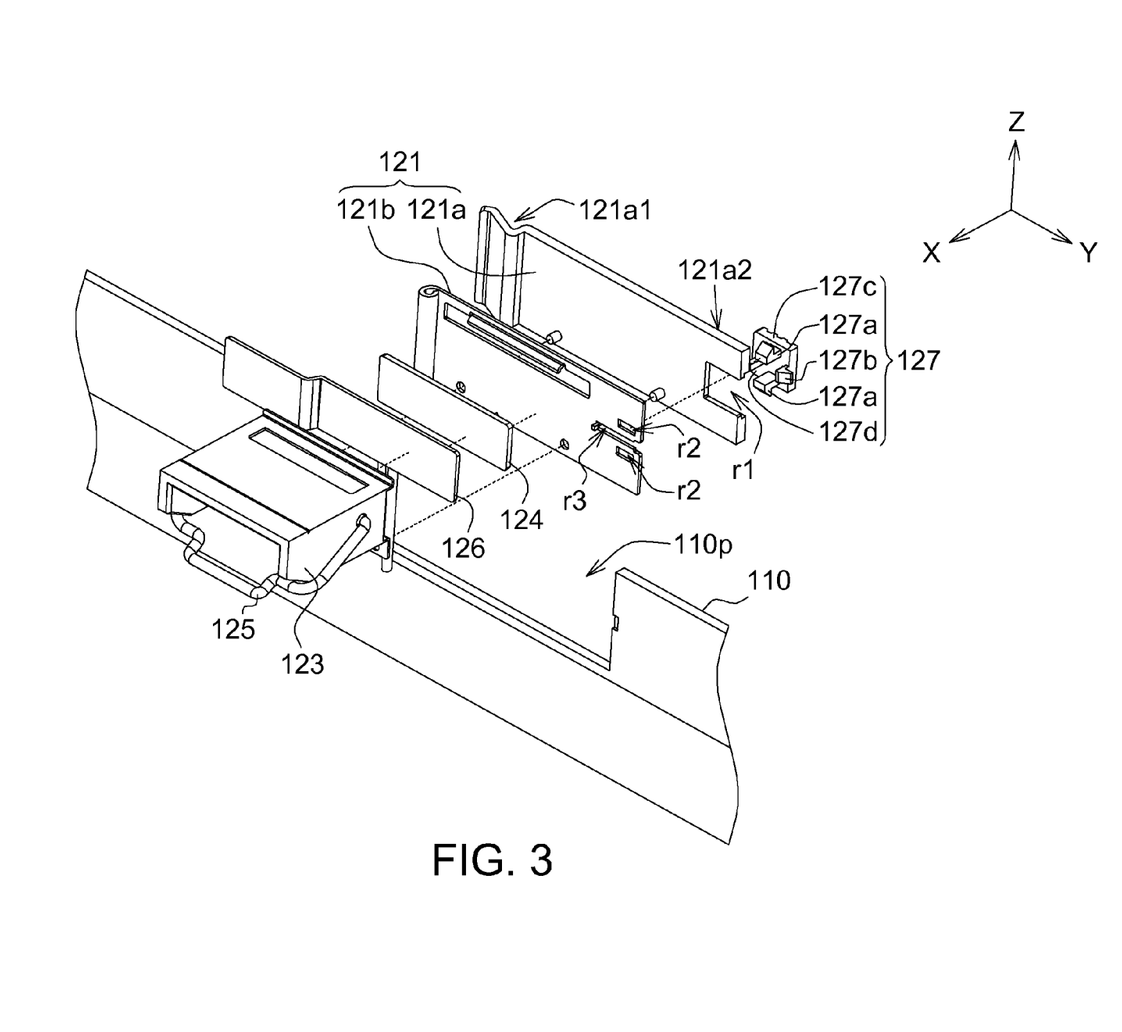
FIG. 3 shows an explosion diagram of a connecting module of one of the mechanisms of FIG. 1.

Referring to FIG. 2A, FIG. 2B and FIG. 3. FIG. 2A and FIG. 2B respectively illustrate schematic diagrams of a connecting module of one of the mechanisms of FIG. 1 located at different positions. FIG. 3 shows an explosion diagram of a connecting module of one of the mechanisms of FIG. 1. The mechanism 100 includes a casing 110 and a connecting module (detailed descriptions are given below). The casing 110 has a through hole 110p. The connecting module is disposed at the casing 110 and includes a door 121, a connecting port 123 and an elastic member 125. The door 121 is rotatably coupled to the casing 110 so as to be located at a first position (as indicated in FIG. 2A) to cover the through hole 110p or located at a second position (as indicated in FIG. 2B) to open with respect to the casing 110. The connecting port 123 is disposed at an inner side of the door 121 so as to be disposed inside the casing 110 when the door 121 is located at the first position (as indicated in FIG. 2A) or exposed outside the casing 110 when the door 121 is located at the second position (as indicated in FIG. 2B). The elastic member 125 is rotatably coupled to the connecting port 123 so as to rotate with respect to the connecting port 123 to fasten a plug 300 between the connecting port 123 and the elastic member 125 when the plug 300 is connected to the connecting port 123.

When the connecting port 123 is not used, the user places the door 121 at a first position for receiving the connecting port 123 in the casing 110 as indicated in FIG. 2A. When the connecting port 123 is used, the user places the door 121 at the second position as indicated in FIG. 2B, so that the connecting port 123 is exposed to be connected to the plug 300. Thus, the connecting module of the present embodiment of the invention is conformed to the thinning tendency, and the product is convenient for the user to carry and use. Moreover, the connecting port 123 of the present embodiment of the invention is a LAN port realized by such as a 4.9 mm high semi-high RJ45. Since the connecting port 123 of the semi-high RJ45 in the Z-axis direction is shorter than an ordinary RJ45 module, the disposition of the elements of the casing 110 in the Z-axis direction is more flexible, and there is no need to reserve a large volume of interior space in the Z-axis direction simply for receiving the connecting port 123 in the casing 110. In other words, as indicated in FIG. 1, the height of the mechanism 100 in the Z-axis direction can be further reduced to be conformed to the thinning tendency in product design.

As indicated in FIG. 3, the connecting module further includes a flexible circuit board 126 disposed between the door 121 and the connecting port 123 for electrically coupling the connecting port 123 and a mother board (not illustrated). In general, the connecting port and the printed circuit board are stacked in a top-down manner, such that the connecting port can be electrically coupled to the mother board through the printed circuit board. In other words, since ordinary connecting port and printed circuit board occupy a certain space in the Z-axis direction, the thickness of the mechanism having the connecting port and the printed circuit board is thus increased. In comparison to the ordinary connecting port and printed circuit board, the connecting port 123 and the flexible circuit board 126 of the present embodiment of the invention are coupled but are not stacked with each other in the Z-axis direction, and there is no need to reserve space in the casing 110 in the Z-axis direction for the flexible circuit board 126. Thus, the mechanism 100 of FIG. 1 can be further thinned.

In the present embodiment of the invention, the door 121 includes a cover 121a and a supporting member 121b. The supporting member 121b is disposed between the cover 121a and the flexible circuit board 126 and rotatably coupled to the casing 110. Let the supporting member 121b be formed by a conductive material. The supporting member 121b is such as formed by a metal for increasing the overall hardness and strength of the door 121. The connecting port 123 normally has several pins for being electrically coupled to the flexible circuit board 126. If the length of the pins of the connecting port 123 is larger than the thickness of the flexible circuit board 126, the pins of the connecting port 123 will be exposed outside the flexible circuit board 126. Under such circumstances, the pins of the connecting port 123 may contact the supporting member 121b and result in short-circuiting. Therefore, the connecting module of the present embodiment of the invention further includes an insulation member 124 disposed between the supporting member 121b and the flexible circuit board 126 for isolating the pins of the connecting port 123 exposed outside the flexible circuit board 126 so as to avoid the occurrence of short-circuiting. The insulation member 124 can be formed by Mylar.

Referring to FIG. 3 and FIG. 4A-4G, operational diagrams of the connecting module of FIG. 2A and FIG. 2B are respectively shown. Details of the connecting module of the present embodiment of the invention are further disclosed below with accompanying drawings FIGS. 4A-4G.

Figure 4A:
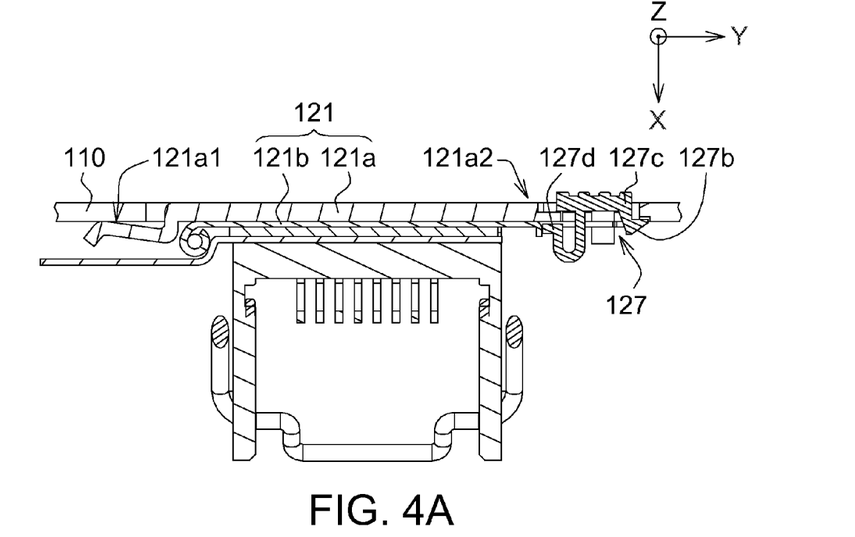
FIG. 4A-4G show operational diagrams of the connecting module of FIG. 2A and FIG. 2B.

As indicated in FIG. 3 and FIG. 4A, the cover 121a has a lateral portion 121a1 and a lateral portion 121a2 opposite to each other. The lateral portion 121a1 has elasticity. When the door 121 is located at the first position, the lateral portion 121a1 is deformed to press the casing 110. The connecting module further includes an engaging member 127 reciprocally and movably disposed at the door 121 so as to be engaged with the casing 110 when the door 121 is located at the first position. The engaging member 127, the door 121 and the casing 110 of the present embodiment of the invention are coupled to each other in the following manners. The lateral portion 121a2 has a disposition recess r1. The supporting member 121b has a through hole r2 and an engaging recess r3. The engaging member 127 has a first hook 127a, a second hook 127b, a pressing portion 127c and an elastic portion 127d. The first hook 127a, the second hook 127b and the elastic portion 127d are connected to the pressing portion 127c. The first hook 127a passes through the disposition recess r1 so as to be engaged with the through hole r2 for the door 121 and the engaging member 127 to be engaged with each other. Since the width of the through hole r2 in the Y-axis direction is larger than the width of the first hook 127a in the Y-axis direction, the engaging member 127 still can move in the Y-axis direction despite that the first hook 127a is engaged with the through hole r2. The second hook 127b passes through the disposition recess r1 so as to be engaged with the casing 110 when the door 121 is located at the first position. Thus, even when the user moves the portable electronic device of the present embodiment of the invention, the door 121 still firmly covers the through hole 110p and is located at the first position, and will not open at will. The elastic portion 127d passes through the disposition recess r1 and the engaging recess r3 so as to press the supporting member 121b.

Figure 4B:
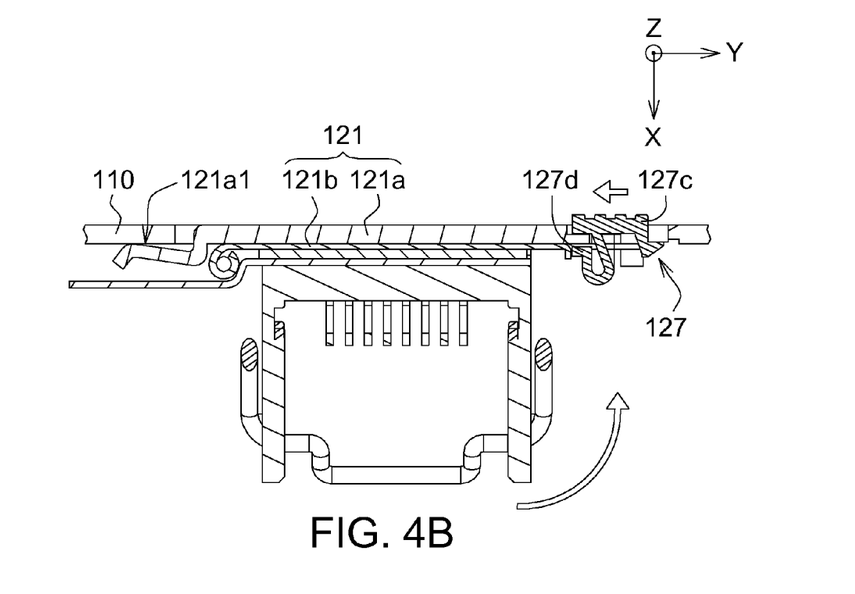

As indicated in FIG. 3 and FIG. 4B, when the user presses the pressing portion 127c, the engaging member 127 is moved towards −Y-axis direction, the engaging state between the engaging member 127 and the casing 110 is released, and an elastic force generated by the deformed lateral portion 121a1 of the cover 121a drives the door 121 to rotate towards the second position. Meanwhile, since the engaging member 127 is moved towards the −Y-axis direction, the deformation of the elastic portion 127d generates an elastic force. Once the user stops pressing the pressing portion 127c, the elastic force generated by the elastic portion 127d drives the engaging member 127 to move towards the +Y-axis direction and returns to the initial position.

Figure 4C:
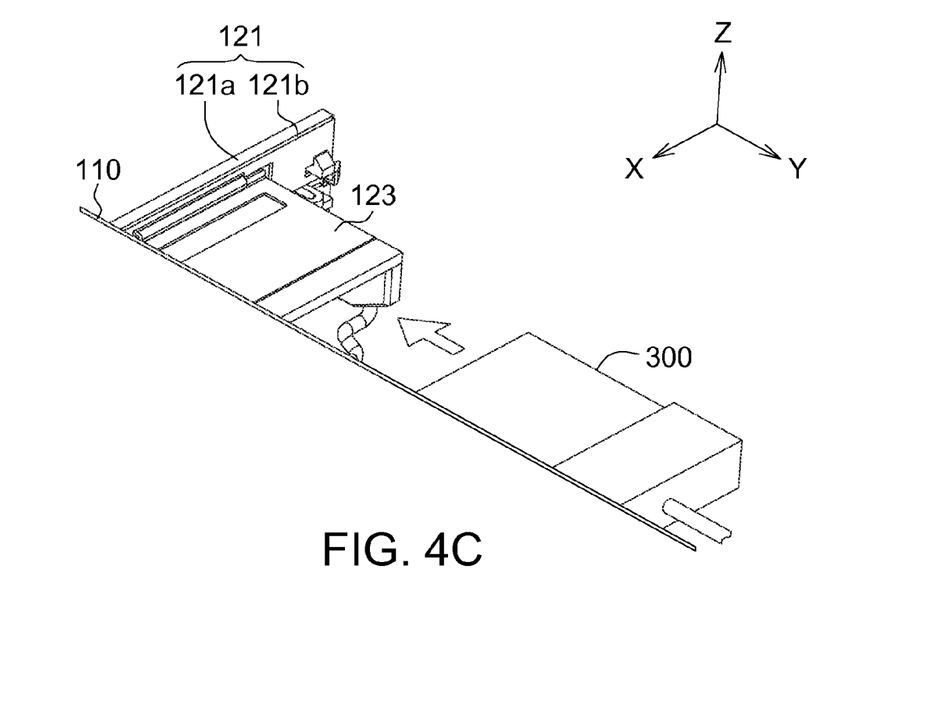

As indicated in FIG. 3 and FIG. 4C, the door 121 is located at the second position and exposed outside the casing 110. Meanwhile, the user may connect the plug 300 to the connecting port 123 so as to be electrically coupled to the mother board via the connecting port 123 and the flexible circuit board 126.

Figure 4D:
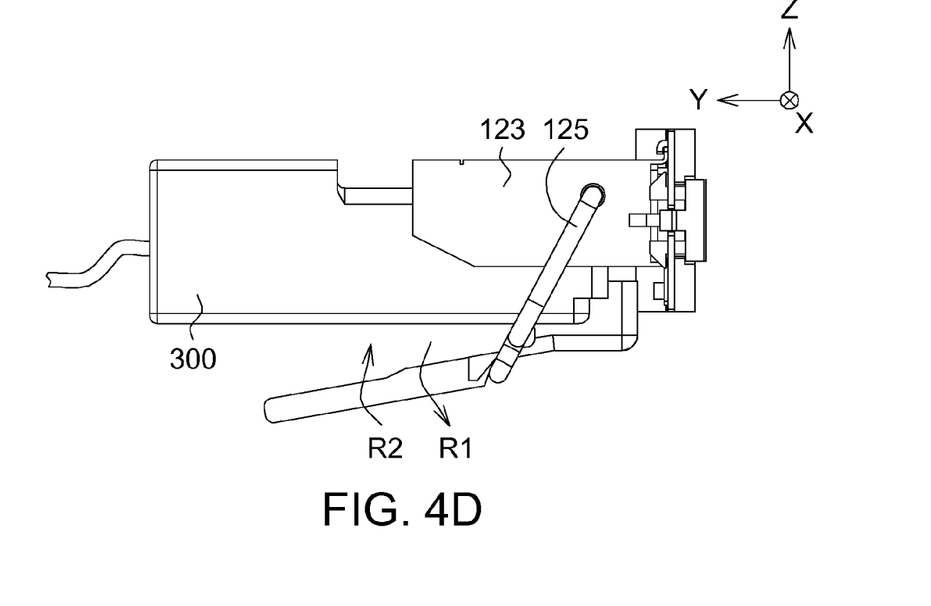

As indicated in FIG. 3 and FIG. 4D, for firmly connecting the plug 300 to the connecting port 123 lest the plug 300 might come off easily, the user rotates the elastic member 125 along the direction R1. Meanwhile, the rotation of the elastic member 125 generates an elastic force. Then, when the plug 300 is connected to the connecting port 123 and the user stops applying force to the elastic member 125, the elastic member 125 is rotated along the direction R2 with its own elastic force. Here, the direction R2 is opposite to the direction R1. Thus, the plug 300 is fastened between the connecting port 123 and the elastic member 125.

Figure 4E:
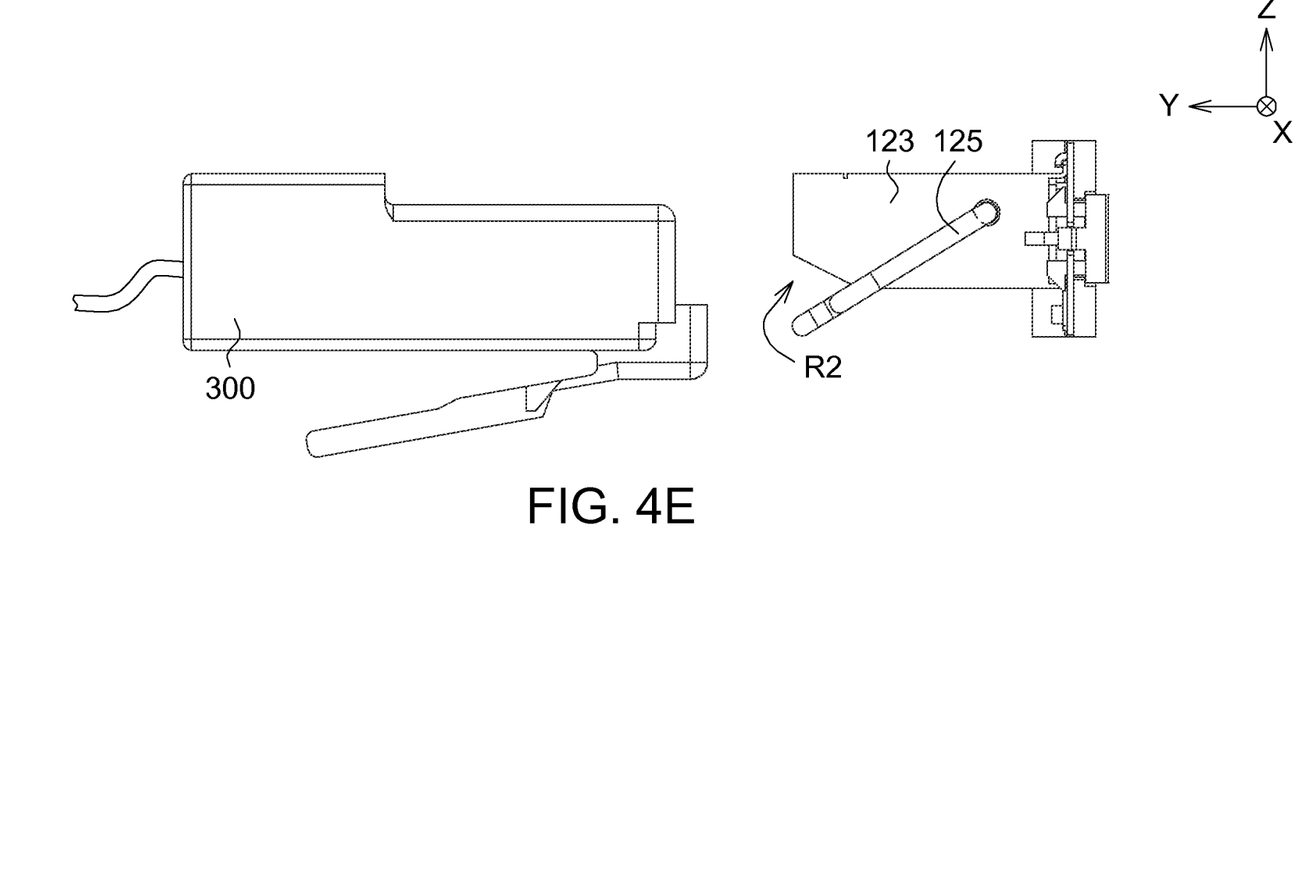

As indicated in FIG. 3 and FIG. 4E, the user may unplug the plug 300 when the user is not using the connecting port 123 and the plug 300. Meanwhile, the elastic member 125, no more blocked by the plug 300, is continually rotated along the direction R2 with its own elastic force to return to the initial position.

Figure 4F:
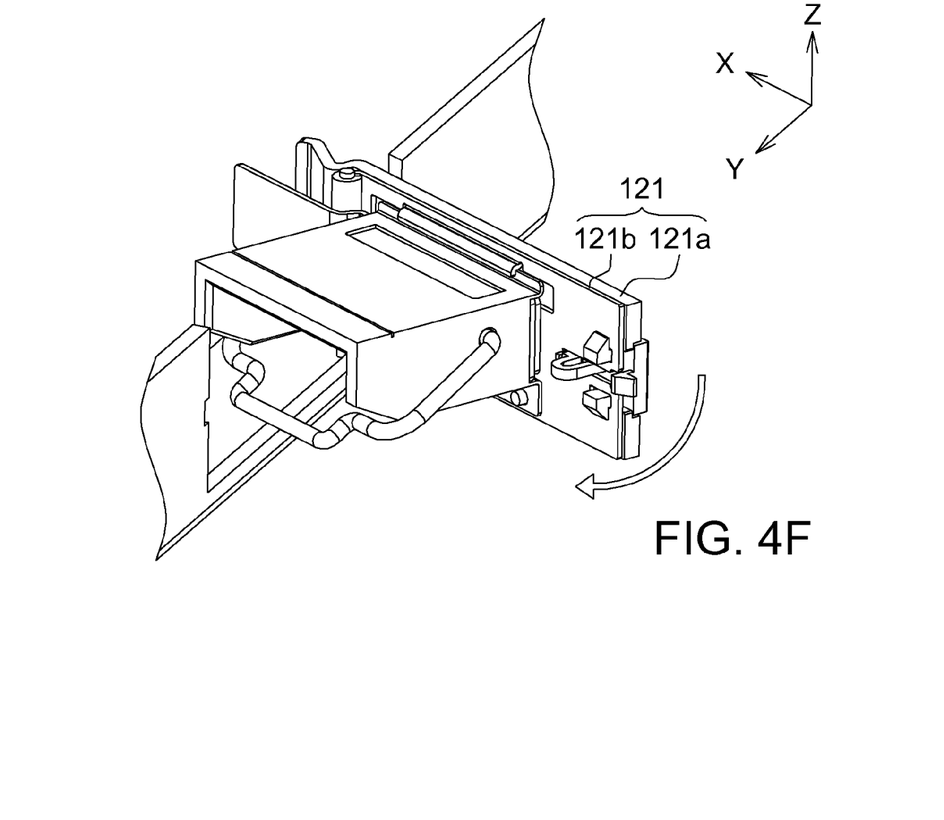

As indicated in FIG. 3 and FIG. 4F, the user pushes back the door 121 towards the first position.

Figure 4G:
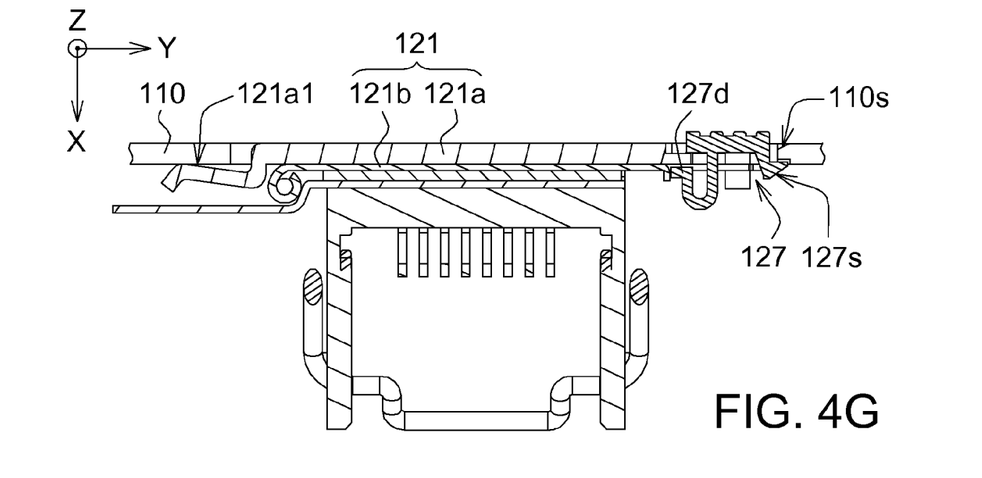

As indicated in FIG. 3 and FIG. 4G, in the course of the door 121 being pushed back to the first position, the bevel 127s of the engaging member 127 contacts the bevel 110s of the casing 110 and makes the engaging member 127 moved towards −Y-axis direction. Meanwhile, the elastic portion 127d is pushed and deformed. When the door 121 turns to the first position, the bevel 127s does not contact the bevel 110s and the elastic portion 127d is no more being pushed, and the elastic force generated by the deformation of the elastic portion 127d drives the engaging member 127 to return to the initial position so as to be engaged with the casing 110. Meanwhile, the lateral portion 121a1 is again deformed to press the casing 110 so as to provide an elastic force to rotate the door 121 when the user releases the engaging state between the engaging member 127 and the casing 110.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A connecting module disposed at a casing having a through hole, wherein the connecting module comprises:
   a door rotatably coupled to the casing so as to be located at a first position to cover the through hole or located at a second position to open with respect to the casing;
   a connecting port disposed at an inner side of the door so as to be disposed inside the casing when the door is located at the first position or exposed outside the casing when the door is located at the second position;
   and an elastic member rotatably coupled to the connecting port so as to rotate with respect to the connecting port to fasten a plug between the connecting port and the elastic member when the plug is connected to the connecting port;
   a flexible circuit board disposed between the door and the connecting port; and
   wherein the door comprises a cover and a supporting member, and the supporting member is disposed between the cover and the flexible circuit board and rotatably coupled to the casing.

2. The connecting module according to claim 1, wherein the supporting member is a conductive material, and the connecting module further comprises an insulation member disposed between the supporting member and the flexible circuit board.

3. The connecting module according to claim 1, wherein a first lateral portion of the cover has elasticity, the first lateral portion of the cover is deformed to press the casing when the door is located at the first position, the connecting module further comprises an engaging member reciprocally and movably disposed at the door so as to be engaged with the casing when the door is located at the first position, and an elastic force generated by the first lateral portion of the deformed cover drives the door to rotate towards the second position when the engaging member is moved towards a direction so as to be released from the engaging state with the casing.

4. The connecting module according to claim 3, wherein a second lateral portion of the cover has a disposition recess, the first lateral portion of the cover is opposite to the second lateral portion of the cover, the supporting member has a through hole and an engaging recess having a pressing portion, a first hook, a second hook and an elastic portion, the first hook, the second hook and the elastic portion are connected to the pressing portion, the first hook passes through the disposition recess so as to be engaged with the through hole, the second hook passes through the disposition recess so as to be engaged with the casing when the door is located at the first position, and the elastic portion passes through the disposition recess and the engaging recess so as to press the supporting member to be deformed to generate an elastic force when the engaging member is moved towards the direction, such that the engaging member is moved towards an opposite direction.

5. A mechanism, comprising:
   a casing having a through hole; and
   a connecting module disposed at the casing and comprises:
   a door rotatably coupled to the casing so as to be located at a first position to cover the through hole or be located at a second position to open with respect to the casing;
   a connecting port disposed at an inner side of the door so as to be disposed inside the casing when the door is located at the first position or exposed outside the casing when the door is located at the second position;
   and an elastic member rotatably coupled to the connecting port so as to rotate with respect to the connecting port to fasten a plug between the connecting port and the elastic member when the plug is connected to the connecting port;
   wherein the connecting module further comprises a flexible circuit board disposed between the door and the connecting port; and
   wherein the door comprises a cover and a supporting member, and the supporting member is disposed between the cover and the flexible circuit board and rotatably coupled to the casing.

6. The mechanism according to claim 5, wherein the supporting member is a conductive material, and the connecting module further comprises an insulation member disposed between the supporting member and the flexible circuit board.

7. The mechanism according to claim 5, wherein a first lateral portion of the cover has elasticity, the first lateral portion of the cover is deformed to press the casing when the door is located at the first position, the connecting module further comprises an engaging member reciprocally and movably disposed at the door so as to be engaged with the casing when the door is located at the first position, and an elastic force generated by the first lateral portion of the deformed cover drives the door to rotate towards the second position when the engaging member is moved towards a direction so as to be released from the engaging state with the casing.

8. The mechanism according to claim 7, wherein a second lateral portion of the cover has a disposition recess, the second lateral portion of the cover is opposite to the second lateral portion of the cover, the supporting member has a through hole and an engaging recess having a pressing portion, a first hook, a second hook and an elastic portion, the first hook, the second hook and the elastic portion are connected to the pressing portion, the first hook passes through the disposition recess so as to be engaged with the through hole, the second hook passes through the disposition recess so as to be engaged with the casing when the door is located at the first position, and the elastic portion passes through the disposition recess and the engaging recess so as to press the supporting member to be deformed to generate an elastic force when the engaging member is moved towards the direction, such that the engaging member is moved towards an opposite direction.

* * * * *